United States Patent
Depenheuer

[15] 3,670,300
[45] June 13, 1972

[54] SPOT-TYPE BRAKE WEAR INDICATOR

[72] Inventor: Otto Depenheuer, Bad Homburg, Germany

[73] Assignee: ITT Industries, Inc., New York, N.Y.

[22] Filed: Sept. 28, 1970

[21] Appl. No.: 76,118

[30] Foreign Application Priority Data

Oct. 13, 1969 Germany ............... P 19 51 475.1

[52] U.S. Cl. .................................... 340/52 A, 200/61.44
[51] Int. Cl. .................................... B60t 17/22, G08b 21/00
[58] Field of Search .............. 340/52, 52 A, 52 B; 200/61.4, 200/61.41, 61.42, 61.43, 61.44

[56] References Cited

UNITED STATES PATENTS 3,339,676  9/1967  Quinn ........................ 340/52 UX
3,363,232  1/1968  Mizsak ........................ 340/52

Primary Examiner—Alvin H. Waring
Attorney—C. Cornell Remsen, Jr., Walter J. Baum, Paul W. Hemminger, Charles L. Johnson, Jr., Philip M. Bolton, Isidore Togut, Edward Goldberg and Menotti J. Lombardi, Jr.

[57] ABSTRACT

This electrical warning device for indicating brake lining wear includes an electrical circuit which is closed by means of the brake shoe coming into electrical contact with a contact element carried by the brake shoe retaining spring when the brake lining wears down to a predetermined thickness. The contact element is electrically insulated from the retaining spring.

4 Claims, 1 Drawing Figure

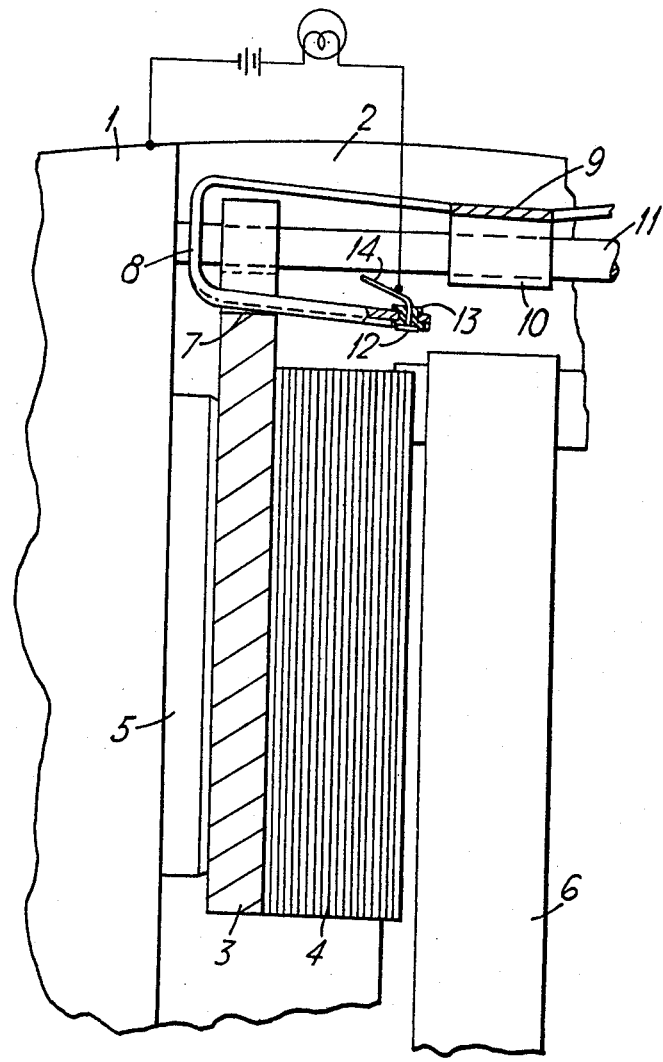

SPOT-TYPE BRAKE WEAR INDICATOR

FIELD OF THE INVENTION

This invention relates to a brake lining wear indicator having a switch for closing an indicating circuit when the brake lining is worn.

A typically known electric warning device for brake pad wear has a contact element in the brake shoe which contacts the friction surface of the brake disc when the pads are worn so that an electric circuit is closed to switch on a warning device such as a signal lamp on the dashboard. This device is shown in French Patent 1,320,119. The disadvantage of this warning device is that once the brakes are released the electric circuit is interrupted and the alarm signal disappears. Furthermore the contact element has to be replaced with each brake shoe replacement thereby unnecessarily increasing costs.

SUMMARY OF THE INVENTION

An object of present invention is to provide a warning device for the spot-type disc brakes which eliminates the disadvantage of the known warning devices and can easily be placed in the brake housing.

According to the invention this is achieved by providing the retaining spring with a conductive contact element which is insulated from the retaining spring. The contact element contacts the carrier plate or a different conductive part of the brake shoe when the pad wear has reached a predetermined extent so that the electric circuit is closed to actuate the warning device. In this way is achieved that after a certain pad wear, the warning device remains switched on even when the brakes are released again because the retaining spring presses the contact element constantly against the carrier plate of the brake shoe once the brake shoe has come into a certain position. A particularly advantageous embodiment of the invention is achieved by arranging the contact element in a recess provided in an essentially known retaining spring consisting of two crossed sheet metal strips whose arms parallel to the disc brake rest on the housing and the arms perpendicular to the brake disc rest on the brake shoes.

BRIEF DESCRIPTION OF THE DRAWING

The drawing is a partial cross sectional view of a disc brake embodying the present invention.

DESCRIPTION OF THE PREFERRED EMBODIMENTS

The drawing shows a cutout of the housing of a spot-type disc brake. The housing 1 receives the brake shoe consisting of the carrier plate 3 and the friction pad 4 in an opening 2. The piston 5 of a hydraulic actuating appliance lies against the back of the carrier plate 3 and displaces the brake shoe upon brake actuation towards the brake disc 6. On the upper edge 7 of the carrier plate 3 rests the arm 8 of the retaining spring 9 which grips with its other arm 10 under the retaining pin 11 fixed in the housing 1. A widely used disc brake of this type having a sheet metal spring for retracting the brake pad is shown in the German periodical Automobil Industrie Heft 9F/25.4 1963.

The free end of the arm 8 of the retaining spring provides a contact element 12 which is kept in an opening in the retaining spring by an insulating body 13. For the connection to the electric circuit of the warning device the contact element 12 provides a contact lug 14 to which a connecting wire is fixed.

The second pole of the electric warning device is directly connected to the housing 1 which is in contact with the carrier plate 3 of the brake shoe.

With increasing wear of the friction pad 4 the carrier plate 3 of the brake shoe continuously approaches the brake disc 6. As soon as the pad 4 has reached its minimum thickness at which the brake shoe should be replaced the carrier plate 3 is so close to the brake disc that its edge 7 contacts the element 12 on the retaining spring 9 and the electric circuit is closed to switch on the warning device. Since the carrier plate 3 of the brake shoe remains in contact with the retaining spring 9 or with the contact element 12, fixed to the spring, even in released position of the brake, the warning device which may be a warning light on the dashboard remains constantly switched on so that the driver will see the warning light even when the brakes are released.

While I have described above the principles of my invention in connection with specific apparatus it is to be clearly understood that this description is made only by way of example and not as a limitation to the scope of my invention as set forth in the accompanying claims.

I claim:

1. A brake lining wear indicator for a spot-type disc brake comprising:
   a brake disc;
   a brake housing embracing said disc;
   at least one brake shoe carrying a brake lining of friction material disposed in said housing and in braking association with said disc;
   a retaining spring to hold said shoe in said housing, said retaining spring being supported on said housing and containing a free end extending through an aperture adjacent the periphery of said shoe, said free end extending from said shoe toward said disc; and
   a brake lining wear indicator device actuated by closing an electric circuit;
   said free end of said retaining spring carrying a conductive contact element thereon adjacent said disc, said contact element being insulated from said retaining spring and contacting said shoe when the brake lining has reached a predetermined thickness to close said electric circuit and actuate said indicator device.

2. An indicator according to claim 1, wherein said electric circuit is coupled to said contact element and said shoe.

3. An indicator according to claim 1, wherein said contact element extends through an aperture in said free end of said retaining spring adjacent said disc.

4. An indicator according to claim 3, wherein said electric circuit includes
   said indicator device,
   a source of voltage coupled in a series circuit arrangement with said indicator device, and
   one terminal of said series circuit is coupled to said contact element and the other terminal of said series circuit is coupled to said housing which is in electrical contact with said shoe.

* * * * *